(12) United States Patent
Mizunuma et al.

(10) Patent No.: US 8,830,196 B2
(45) Date of Patent: Sep. 9, 2014

(54) INFORMATION PROCESSING APPARATUS, INFORMATION PROCESSING METHOD, AND PROGRAM

(75) Inventors: Hiroyuki Mizunuma, Tokyo (JP); Kazuyuki Yamamoto, Kanagawa (JP); Ikuo Yamano, Tokyo (JP); Kunihito Sawai, Kanagawa (JP); Osamu Shigeta, Tokyo (JP); Akihiro Komori, Tokyo (JP); Nariaki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/424,090

(22) Filed: Mar. 19, 2012

(65) Prior Publication Data
US 2012/0242576 A1    Sep. 27, 2012

(30) Foreign Application Priority Data
Mar. 24, 2011    (JP) .................................. 2011-065205

(51) Int. Cl.
*G06F 3/041* (2006.01)
*G06F 3/033* (2013.01)
*G06F 1/16* (2006.01)
*G06F 3/0488* (2013.01)
*G06F 3/0485* (2013.01)

(52) U.S. Cl.
CPC .......... *G06F 1/1626* (2013.01); *G06F 3/04883* (2013.01); *G06F 3/04886* (2013.01); *G06F 3/0485* (2013.01)

USPC ......................................................... 345/173

(58) Field of Classification Search
USPC .................................................. 345/173–177
See application file for complete search history.

(56) References Cited

U.S. PATENT DOCUMENTS

| | | | | |
|---|---|---|---|---|
| 7,532,205 | B2 * | 5/2009 | Gillespie et al. | 345/173 |
| 2007/0236475 | A1 * | 10/2007 | Wherry | 345/173 |
| 2010/0088641 | A1 * | 4/2010 | Choi | 715/828 |

FOREIGN PATENT DOCUMENTS

JP    2005-049994    2/2005

* cited by examiner

*Primary Examiner* — Andrew Sasinowski
(74) *Attorney, Agent, or Firm* — Sherr & Jiang, PLLC

(57) ABSTRACT

An information processing apparatus may include a touchpad, a hardware processor, and a storage medium coupled to the processor. The storage medium may store instructions that, when executed by the processor, cause the information processing apparatus to receive a proximity signal indicative of whether a user is providing input to the touchpad; receive a movement signal indicative of whether the input includes movement of an object relative to the touchpad and/or whether the input includes movement of the object from an outer area surrounding an inner area of the touchpad to the inner area of the touchpad; and select one of a pointing user input mode or a scrolling user input mode based on the signals.

15 Claims, 10 Drawing Sheets

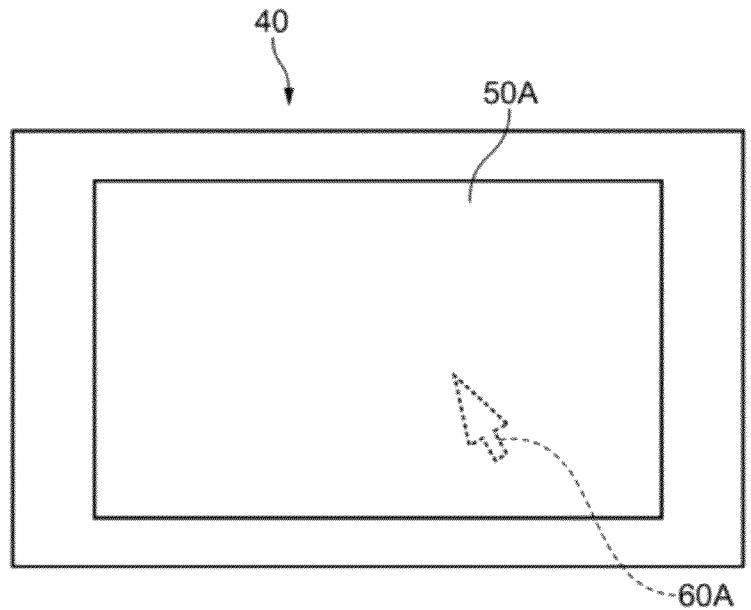
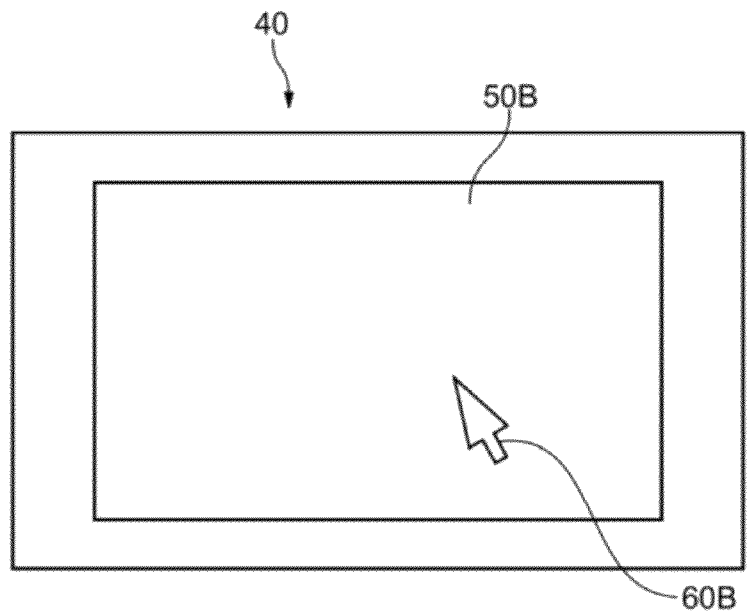

INFORMATION PROCESSING APPARATUS, INFORMATION PROCESSING METHOD, AND PROGRAM

CROSS-REFERENCE TO RELATED APPLICATION

This application claims priority of Japanese Patent Application No. 2011-065205, filed on Mar. 24, 2011, the entire content of which is hereby incorporated by reference.

BACKGROUND

The present disclosure relates to an information processing apparatus including an input device such as a touchpad, an information processing method, and a program.

A touchpad is known as a pointing device for operating a cursor or the like displayed on a screen. For example, Japanese Patent Application Laid-open No. 2005-49994 (hereinafter, referred to as Patent Document 1) discloses a cursor control method aimed at a large movement of a cursor by a small amount of operation on a touchpad (see paragraphs [0021] and [0022], FIG. 1, etc. of Patent Document 1).

SUMMARY

There is a demand for an input device such as the touchpad described above capable of being used with good operability.

In view of the circumstances as described above, it is desirable to provide an information processing apparatus, an information processing method, and a program that are capable of using an input device such as a touchpad with good operability.

Accordingly, there is disclosed an information processing apparatus, which may include a touchpad, a hardware processor, and a storage medium coupled to the processor. The storage medium may store instructions that, when executed by the processor, cause the information processing apparatus to receive a proximity signal indicative of whether a user is providing input to the touchpad; receive a movement signal indicative of whether the input includes movement of an object relative to the touchpad; and select one of a pointing user input mode or a scrolling user input mode. The selection may be based on at least one of an amount of time for which the user continuously provides input not including movement of the object relative to the touchpad or an amount of time for which the user continuously fails to provide input.

There is also disclosed a method of selecting a user input mode. The method may include receiving a proximity signal indicative of whether a user is providing input to a touchpad. The method may also include receiving a movement signal indicative of whether the input includes movement of an object relative to the touchpad. Additionally, the method may include selecting one of a pointing user input mode or a scrolling user input mode based on at least one of an amount of time for which the user continuously provides input not including movement of the object relative to the touchpad or an amount of time for which the user continuously fails to provide input.

Additionally, there is disclosed a non-transitory, computer-readable storage medium storing instructions that, when executed by a processor, cause an information processing apparatus to receive a proximity signal indicative of whether a user is providing input to a touchpad; receive a movement signal indicative of whether the input includes movement of an object relative to the touchpad; and select one of a pointing user input mode or a scrolling user input mode. The selection may be based on at least one of an amount of time for which the user continuously provides input not including movement of the object relative to the touchpad or an amount of time for which the user continuously fails to provide input.

There is also disclosed an information processing apparatus, which may include a touchpad, a hardware processor, and a storage medium coupled to the processor. The storage medium may store instructions that, when executed by the processor, cause the information processing apparatus to receive a proximity signal indicative of whether a user is providing input to the touchpad; receive a movement signal indicative of whether the input includes movement of an object from an outer area surrounding an inner area of the touchpad to the inner area of the touchpad; and select a pointing user input mode when (i) the proximity signal indicates the user is providing input to the touchpad; and (ii) the movement signal indicates the input includes movement of the object from the outer area to the inner area.

In addition, there is disclosed a method of selecting a user input mode. The method may include receiving a proximity signal indicative of whether a user is providing input to a touchpad. The method may also include receiving a movement signal indicative of whether the input includes movement of an object from an outer area surrounding an inner area of the touchpad to the inner area of the touchpad. Additionally, the method may include selecting a pointing user input mode when (i) the proximity signal indicates the user is providing input to the touchpad; and (ii) the movement signal indicates the input includes movement of the object from the outer area to the inner area.

There is also disclosed a non-transitory, computer-readable storage medium storing instructions that, when executed by a processor, cause an information processing apparatus to receive a proximity signal indicative of whether a user is providing input to a touchpad; receive a movement signal indicative of whether the input includes movement of an object from an outer area surrounding an inner area of the touchpad to the inner area of the touchpad; and select a pointing user input mode when (i) the proximity signal indicates the user is providing input to the touchpad; and (ii) the movement signal indicates the input includes movement of the object from the outer area to the inner area.

As described above, according to the embodiments of the present disclosure, the input device such as a touchpad can be used with good operability.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 are schematic views showing screens in a first and second modes according to the first embodiment;

DETAILED DESCRIPTION OF EMBODIMENTS

Hereinafter, embodiments of the present disclosure will be described with reference to the drawings.

First Embodiment

Structure of Information Processing Apparatus

Figure 1:
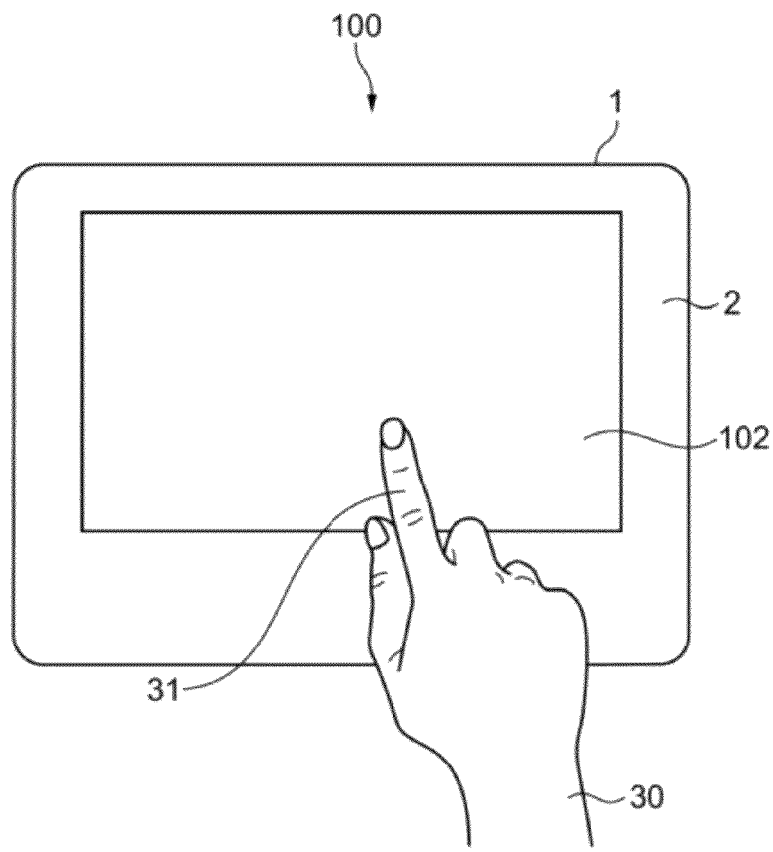
FIG. 1 is a schematic view showing an outer appearance of an information processing apparatus according to a first embodiment of the present disclosure.
Figure 2:
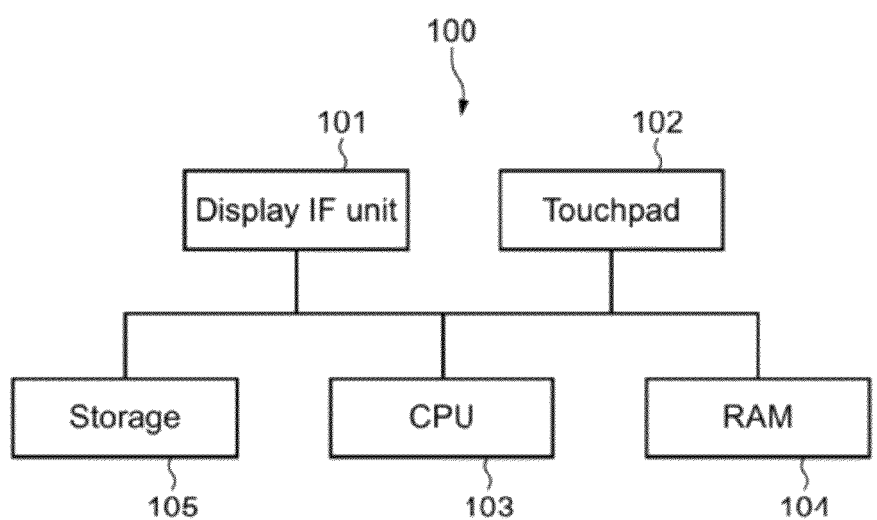
FIG. 2 is a block diagram showing a structural example of the information processing apparatus shown in FIG. 1.

FIG. 1 is a schematic view showing an outer appearance of an information processing apparatus according to a first embodiment of the present disclosure. FIG. 2 is a block diagram showing a structural example of the information processing apparatus shown in FIG. 1.

An information processing apparatus 100 includes a casing 1 held by a user 30, and a touchpad 102 provided to a front surface 2 of the casing 1 and serving as an input unit. The user 30 touches the touchpad 102 with a finger (i.e., an object) 31 or brings the finger 31 close to the touchpad 102. By moving the finger 31, the user 30 can input an operation to indicate a movement direction and movement amount in a two-dimensional space. It should be noted that the material or the size of the casing 1 is not limited. Further, a stylus or the like may be used as an operator.

As shown in FIG. 2, the information processing apparatus 100 includes a display interface (IF) unit 101, the touchpad 102, a central processing unit (CPU) (i.e., a hardware processor) 103, a random access memory (RAM) 104, and a storage (i.e., a non-transitory, computer-readable storage medium) 105.

The touchpad 102 includes a sensor (not shown). When the finger 31 comes close to or comes into contact with the touchpad 102, a proximity signal is output to the CPU 103 from the sensor. Note that "proximity" may include both actual touch contact, as well as non-contacting proximity. Then, when the finger 31 is moved relative to the touchpad 102, a movement signal associated with the movement is output to the CPU 103.

In this embodiment, the touchpad 102 of a capacitive system is used. Therefore, a proximity signal, a movement signal, or the like based on a capacitance change is output to the CPU 103. However, as the touchpad 102, touchpads of other systems such as a resistive system, a surface acoustic wave system, and an infrared ray system may be used.

The storage 105 is a nonvolatile storage device and is a hard disk drive (HDD), a flash memory, or another solid-state memory, for example.

Figure 3:
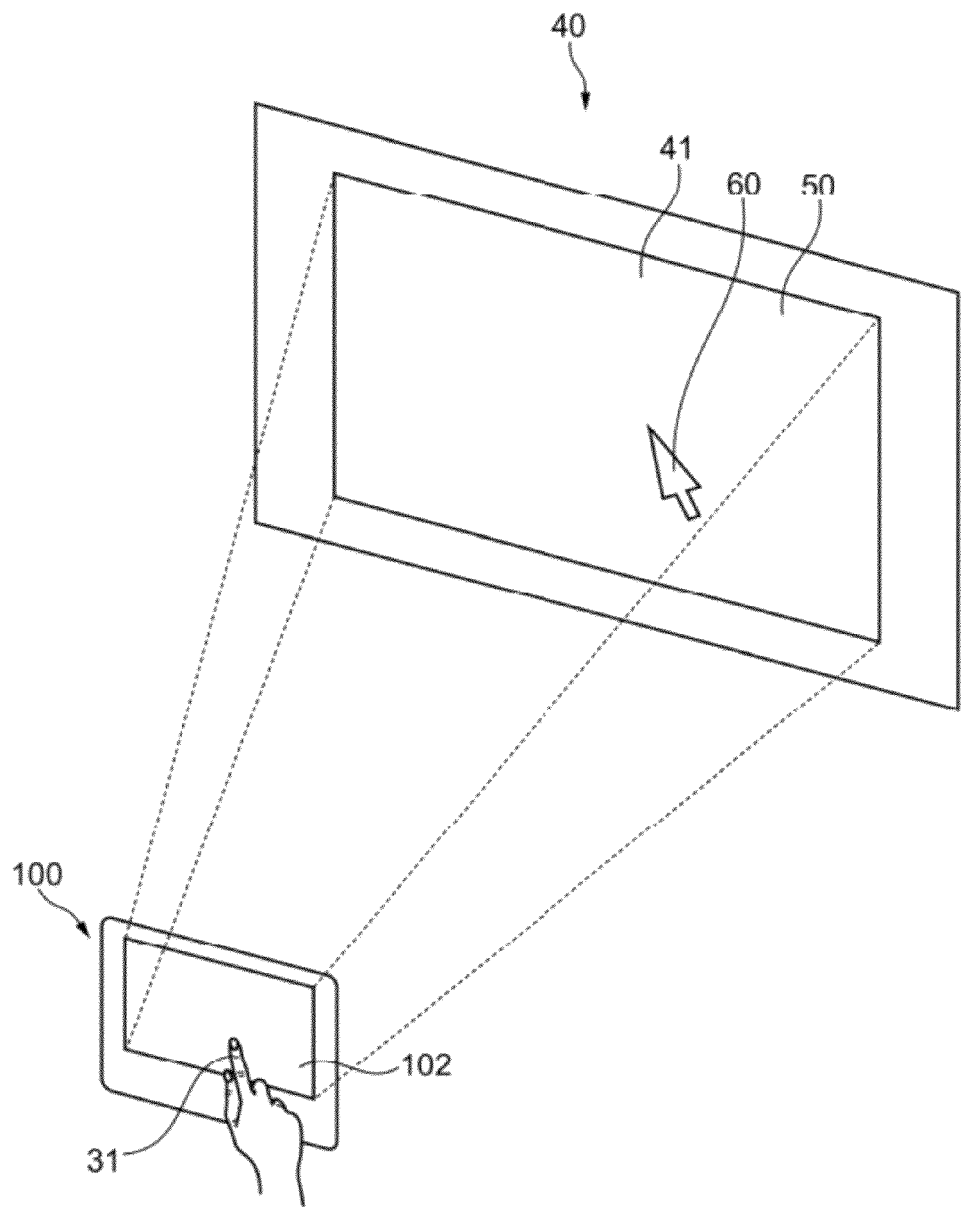
FIG. 3 is a schematic view showing the information processing apparatus shown in FIG. 1 and a display apparatus connected thereto.

The display IF unit 101 is such that it connects the information processing apparatus 100 to a display apparatus 40 including a display 41 (see FIG. 3). Via the display IF unit 101, a control signal or the like for controlling an operation of the display apparatus 40 is output. The control signal or the like is output to the display apparatus 40 in a wired or wireless manner.

The data processing by the information processing apparatus 100 is implemented in cooperation with software stored in the storage 105, a read only memory (ROM) (not shown), and the like and hardware resources of the information processing apparatus 100. Specifically, the CPU 103 loads programs constituting the software (i.e., instructions) stored in the storage 105 and the like to the RAM 104 for execution so that various types of data processing are implemented. In this embodiment, the CPU 103 functions as a mode control unit and executes the following processing.

[Operation of Information Processing Apparatus]

FIG. 3 is a schematic view showing the information processing apparatus 100 of this embodiment and the display apparatus 40 connected thereto. The display apparatus 40 is a display device using liquid crystal or Electro-Luminescence (EL), for example.

In this embodiment, the scrolling of a screen 50 displayed on the display 41 and a movement of a pointer 60 on the screen 50 are controlled by the information processing apparatus 100. Further, a first mode as a mode in which the screen 50 is scrolled (i.e., a scrolling user input mode) and a second mode as a mode in which the pointer 60 is moved (i.e., a pointing user input mode) are switched therebetween. The scrolling of the screen 50 used herein refers to the movement of a display area displayed on the display 41.

FIG. 4 are schematic views showing the screens 50 in the first and second modes according to this embodiment. FIG. 4A is a view of a screen 50A in the first mode, and FIG. 4B is a view of a screen 50B in the second mode.

As described above, an operation to indicate a movement direction and movement amount in a two-dimensional space is input to the touchpad 102. Then, a proximity signal, a movement signal, and the like are output from the touchpad 102 to the CPU 103.

In the first mode, a movement direction and a movement amount are measured based on the signals output from the touchpad 102. Then, based on the measurement result, a scrolling operation of the screen 50A is executed. As shown in FIG. 4A, on the screen 50A in the first mode, a translucent pointer (i.e., an icon indicative of the selected user input mode) 60A is displayed as a first graphical user interface (GUI). The pointer 60A is moved in accordance with the movement of the finger 31 on the touchpad 102.

For example, in an input device such as a touch panel integrated into a display, a drag operation is performed with a finger brought into contact with a display so that a screen is scrolled. Therefore, the movement of the finger and the scrolling operation of the screen can be intuitively grasped with ease.

In this embodiment, a drag operation is input to the touchpad 102 so that the screen 50A is scrolled. In such a case, the translucent pointer 60A is displayed, with the result that it is easy to visually recognize a correspondence relationship between the movement of the finger 31 and the scrolling operation of the screen. As a result, operability of the touchpad 102 is improved.

Also in the second mode, a movement direction and a movement amount are measured based on the signals output from the touchpad 102. Based on the measurement result, a pointing operation for a pointer (i.e., an icon indicative of the selected user input mode) 60B on the screen 50B is executed.

The pointer 60B as a second GUI is obtained by changing a degree of transparency of the pointer 60A shown in FIG. 4A. Therefore, when the scrolling state is switched to the pointing state, the position of the pointer 60B can be grasped with ease.

However, as the first and second GUIs, GUIs completely different from each other in shape, color, or the like may be used. Further, the positions at which the first and second GUIs are displayed may not correspond to each other. Further, the shape or the like of the pointers 60A and 60B can also be set as appropriate.

Figure 5:
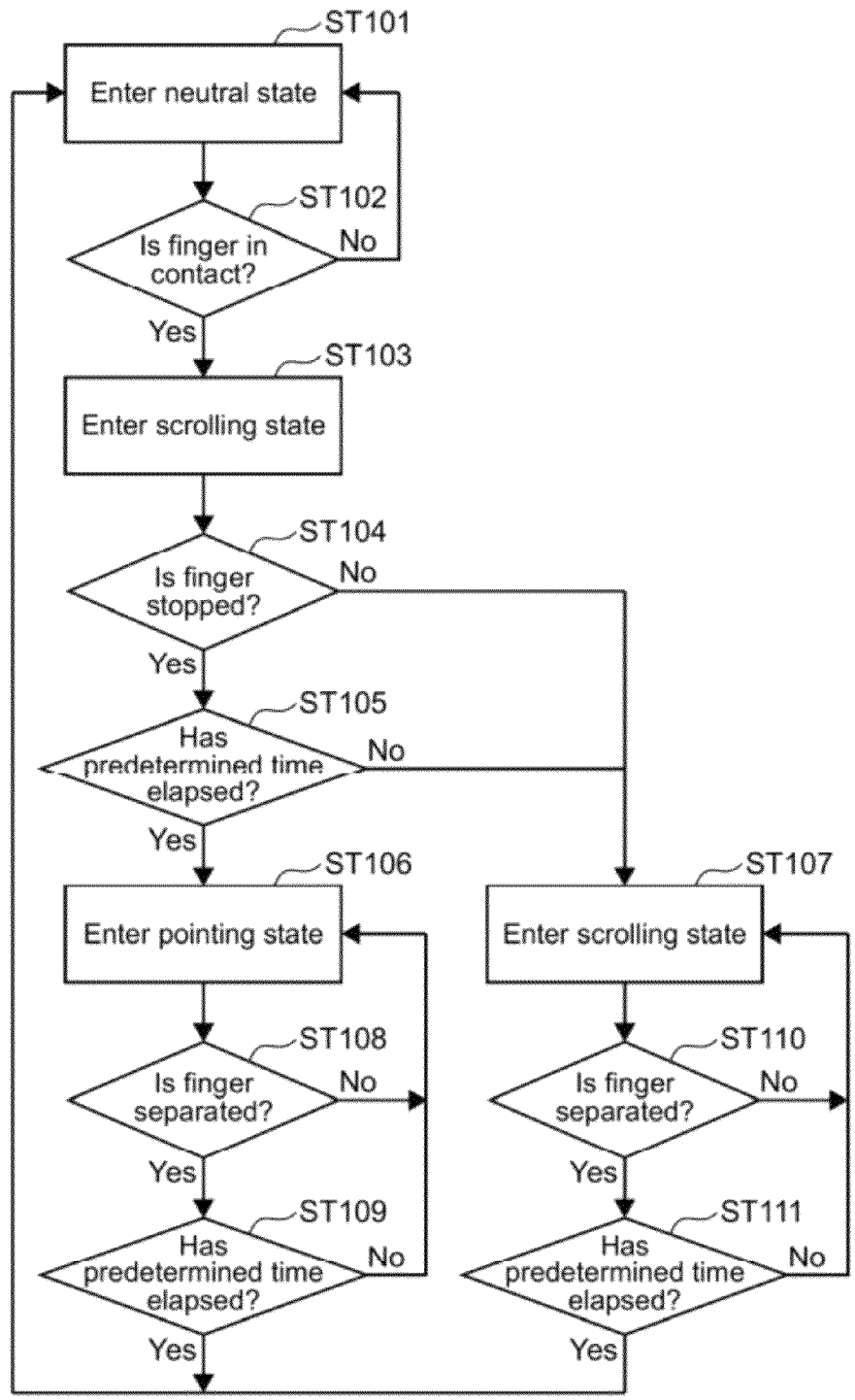
FIG. 5 is a flowchart showing an example of an algorithm of switching processing between the first mode (scrolling) and the second mode (pointing) according to the first embodiment.

FIG. 5 is a flowchart showing an example of an algorithm of switching processing between the first mode (scrolling) and the second mode (pointing) according to this embodiment.

In a neutral state shown in Step 101, whether the finger 31 is in contact with the touchpad 102 is determined (Step 102). The neutral state refers to a state where the finger 31 is not in contact with the touchpad 102 and where a history of past operations is not stored.

In the case where it is determined in Step 102 that the finger 31 is not in contact with the touchpad 102, the neutral state is continued.

In the case where it is determined in Step 102 that the finger 31 is in contact with the touchpad 102, the first mode in which a scrolling operation of the screen 50 can be performed is set (Step 103). The user 30 inputs a drag operation to the touchpad 102. With this operation, the screen 50A can be scrolled in accordance with the movement of the finger 31. Hereinafter, there is a case where the first mode is referred to as a scrolling state.

After the start of the scrolling state in Step 103, whether the finger 31 is stopped is determined (Step 104). In the case where the finger 31 is stopped, it is determined whether an elapsed rest time of the finger 31 on the touchpad 102 (i.e., an amount of time for which the user 30 continuously provides input not including movement of the finger 31 relative to the touchpad 102) exceeds a predetermined time (i.e., a threshold amount of time)(Step 105). The predetermined time is one second to 1.5 seconds, for example, but the predetermined time is not limited thereto and can be set as appropriate. Further, any time measuring method, timer for measurement, or the like may be used.

In the case where it is determined that an elapsed rest time of the finger 31 on the touchpad 102 exceeds a predetermined time, the first mode is switched to the second mode in which a pointing operation can be performed (Step 106). The user 30 can move the pointer 60B on the screen 50B in accordance with the movement of the finger 31. Hereinafter, there is a case where the second mode is referred to as a pointing state.

In the case where the finger 31 is not stopped and is moving in Step 104, the scrolling state is continued (Step 107). Further, also in the case where the finger 31 is moved before a predetermined time elapses in Step 105, the scrolling state is continued (Step 107).

In the pointing state of Step 106, a contact state of the finger 31 under the pointing operation is determined (Step 108). In the case where the contact of the finger 31 to the touchpad 102 is continued, the pointing state is continued.

In the case where the finger 31 is separated from the touchpad 102 under the pointing operation, whether a predetermined time has elapsed since the separation of the finger 31 is determined (i.e., whether an amount of time for which the user 30 continuously fails to provide input exceeds a threshold amount of time is determined) (Step 109). The predetermined time is one second to 1.5 seconds, for example.

In the case where the finger 31 comes into contact with the touchpad 102 again before the predetermined time has elapsed since the separation of the finger 31 from the touchpad 102, the pointing state is continued. For example, when the pointer 60B is largely moved, the drag operation is repeated a plurality of times on the touchpad 102 in some cases. When the drag operation is repeated, the finger 31 is instantaneously separated from the touchpad 102. Step 109 is set so that the pointing state is continued in such a case.

In the case where the predetermined time has elapsed since the separation of the finger 31 from the touchpad 102, the state is returned to the neutral state.

In the scrolling state in Step 107, the contact state of the finger 31 under the scrolling operation is determined (Step 110). In the case where the contact of the finger 31 to the touchpad 102 is continued, the scrolling state is continued.

In the case where the finger 31 is separated from the touchpad 102 under the scrolling operation, whether a predetermined time has elapsed since the separation of the finger 31 is determined (i.e., whether an amount of time for which the user 30 continuously fails to provide input exceeds a threshold amount of time is determined) (Step 111). The predetermined time is one second to 1.5 seconds, for example.

In the case where the finger 31 comes into contact with the touchpad 102 again before the predetermined time has elapsed since the separation of the finger 31 from the touchpad 102, the scrolling state is continued. For example, the drag operation is input a plurality of times in the scrolling operation in some cases. Step 111 is set so that the scrolling state is continued in such a case.

In the case where the predetermined time has elapsed since the separation of the finger 31 from the touchpad 102, the state is returned to the neutral state.

Hereinabove, in the information processing apparatus 100 according to this embodiment, the first mode in which the screen 50A is scrolled and the second mode in which the pointer 60B on the screen 50B is moved are switched therebetween based on the operation on the movement direction and movement amount. Therefore, the touchpad 102 can be used with good operability.

For example, in a remote operation using the touchpad 102 as shown in FIG. 3, the user 30 looks at the screen 50 displayed on the display 41 without looking at the hands when performing operations. At this time, unlike the operation on a touch panel, it is difficult to directly touch GUIs such as icons and buttons on the screen 50. Therefore, the pointing operation using a cursor or the like is necessary.

Various operations such as the drag operation on the touchpad 102 are performed for execution of the pointing operation described above. As a result, it is difficult to execute the scrolling operation of the screen 50 by the same drag operation or the like.

In this embodiment, however, the first mode in which the scrolling operation can be performed and the second mode in which the pointing operation can be performed are switched therebetween. Accordingly, the scrolling operation and the pointing operation can be executed by the same drag operation or the like.

Further, in this embodiment, the first and second modes are switched therebetween based on the rest time of the finger 31 on the touchpad. For example, in the scrolling state in Step 103 shown in FIG. 5, the screen 50 is scrolled to a desired position. Then, in Steps 104 and 105, the finger 31 is stopped on the touchpad 102 for a predetermined time. After that, the state is switched to the pointing state in Step 106. Therefore, the finger 31 only has to be stopped on the touchpad 102 without performing a complicated operation so that the state can be smoothly switched from the scrolling state to the pointing state.

For example, in the scrolling state in Step 107, the finger 31 is stopped on the touchpad 102 for a predetermined time. With this operation, the switching processing from the scrolling state to the pointing state may be executed.

As shown in FIGS. 4A and 4B, in the scrolling state, the translucent pointer 60A is displayed as a first GUI. In the pointing state, the pointer 60B is displayed as a second GUI. In this manner, the GUIs displayed in the first and second modes are distinguished from each other in this embodiment. Accordingly, the scrolling state and the pointing state can be visually recognized.

Second Embodiment

An information processing apparatus according to a second embodiment of the present disclosure will be described. In the following description, components having the same structures and actions as those of the information processing apparatus 100 described in the above embodiment will not be described or simply described.

In this information processing apparatus, the first and second modes are switched therebetween based on the position of the finger on the touchpad. Specifically, when the finger is moved from a predetermined area of the touchpad, the state is switched to the pointing state. Hereinafter, the predetermined area of the touchpad is referred to as a pointing start area.

Figure 6:
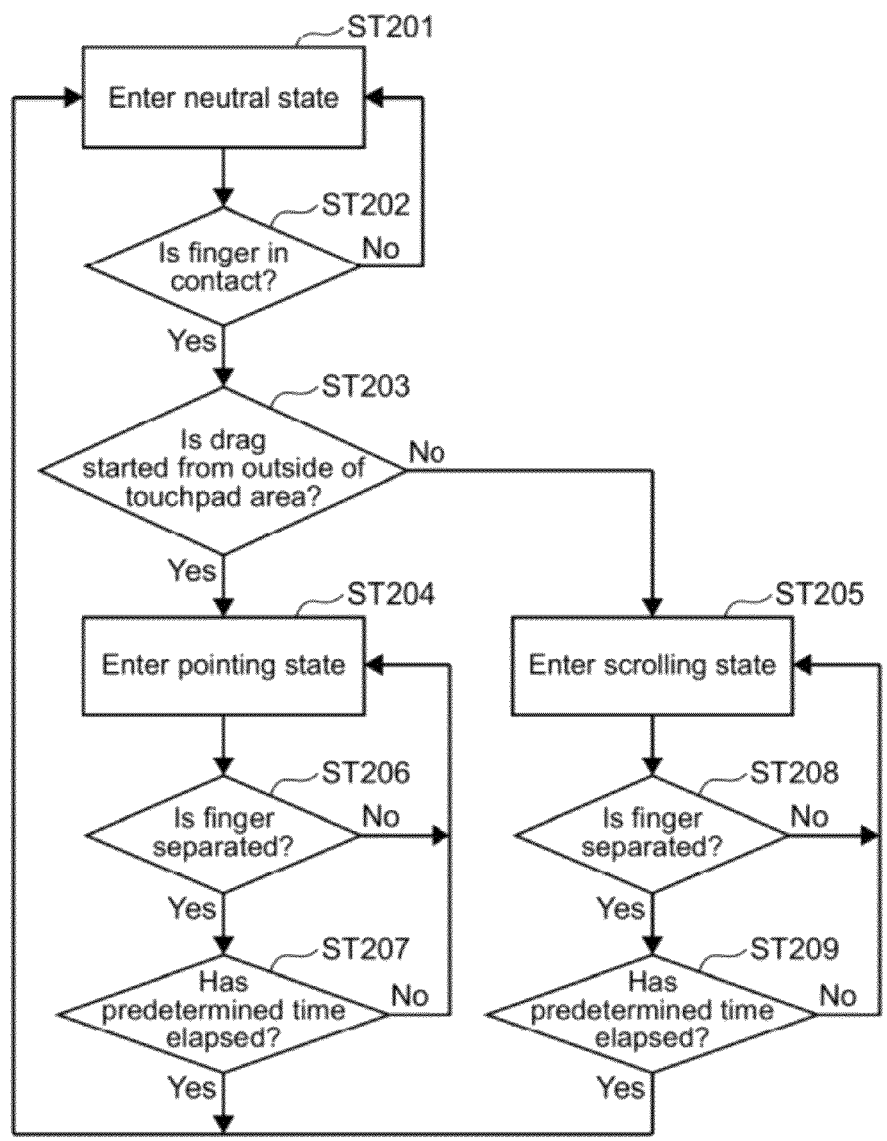
FIG. 6 is a flowchart showing an example of an algorithm of switching processing between a first mode and a second mode according to a second embodiment of the present disclosure.
Figure 7:
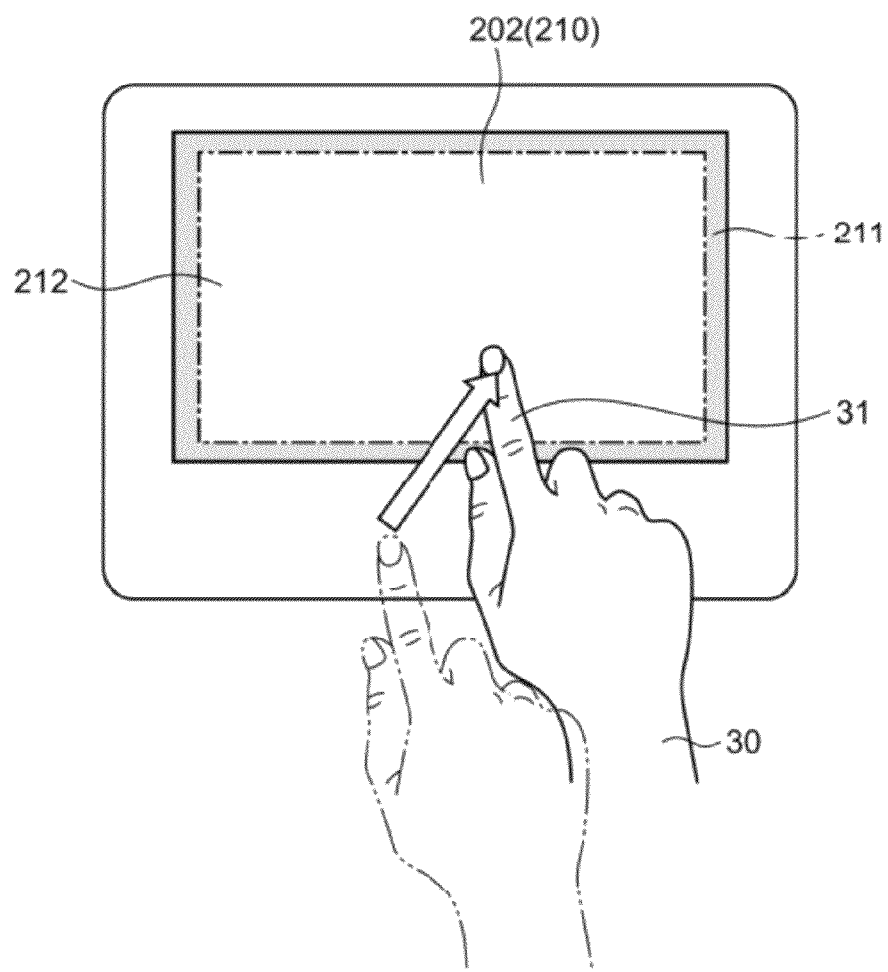
FIG. 7 is an explanatory view of the flowchart shown in FIG. 6.

FIG. 6 is a flowchart showing an example of an algorithm of switching processing between a first mode (scrolling) and a second mode (pointing) according to this embodiment. FIG. 7 is an explanatory view of the flowchart shown in FIG. 6.

In the neutral state shown in Step 201, whether the finger 31 is in contact with the touchpad 202 is determined (i.e., whether the proximity signal indicates the user 30 is providing input to the touchpad 202 is determined) (Step 202).

In the case where it is determined that the finger 31 is in contact with the touchpad 202, whether a drag operation is started from the outside of a touchpad area 210 is determined (i.e., whether the movement signal indicates the input includes movement of the finger 31 from an outer area surrounding an inner area of the touchpad 210 to the inner area of the touchpad 210 is determined) (Step 203). Here, the touchpad area 210 refers to the entire area of the touchpad 202 shown in FIG. 7.

As shown in FIG. 7, in this embodiment, a circumferential portion within the touchpad 202 is set as a pointing start area 211. In the case where a drag operation is started from the pointing start area 211, the state is switched to the pointing state (Step 204). In the case where a drag operation is started from a center (i.e., inner) area 212, which is not the pointing start area 211 (i.e., the outer area surrounding area 212), the state is switched to the scrolling state (Step 205).

In this embodiment, the user 30 intending to perform a pointing operation only has to start a drag operation from the outside of the touchpad 202. The finger 31 first comes into contact with the touchpad 202 in the pointing start area 211, and a drag operation is thus input. Therefore, the drag operation is started from the pointing start area 211. Accordingly, the pointing operation can be started with good operability.

In Step 203 of FIG. 6, whether a drag operation is performed from the outside of the touchpad area 210 is determined. However, also in the case where the finger 31 comes into contact with the pointing start area 211 and a drag operation is input therefrom, the state is switched to the pointing state.

It should be noted that there is a case where in the entire area of the touchpad 202, a circumferential portion thereof is an invalid area. The invalid area refers to an area in which coordinate values (0,0) are typically calculated, for example, and a change in coordinate value is not calculated. In this case, a circumferential portion of a valid area inside the invalid area is set as the pointing start area. Then, the valid area is set as the touchpad area shown in Step 203 of FIG. 7. The user 30 intending to perform the pointing operation only has to start a drag operation from the outside of the valid area.

The processing in Steps 204, 206, and 207 in the pointing state and the processing in Steps 205, 208, and 209 in the scrolling state are the same as the processing described in the first embodiment.

Hereinabove, in this embodiment, when the finger 31 is moved from the pointing start area 211 of the touchpad 202, the state is switched to the pointing state. Accordingly, by appropriately selecting the start position of a drag operation, it is possible to easily select the pointing state and the scrolling state.

It should be noted that the switching processing according to this embodiment and the switching processing according to the first embodiment may be combined. For example, the algorithm shown in FIG. 5 is applied to the center area 212 other than the pointing start area 211 in the touchpad 202 shown in FIG. 7. Then, when the drag operation is input from the outside of the touchpad area 210, the state is switched to the pointing state. Such an algorithm may be adopted.

Third Embodiment

Figure 8:
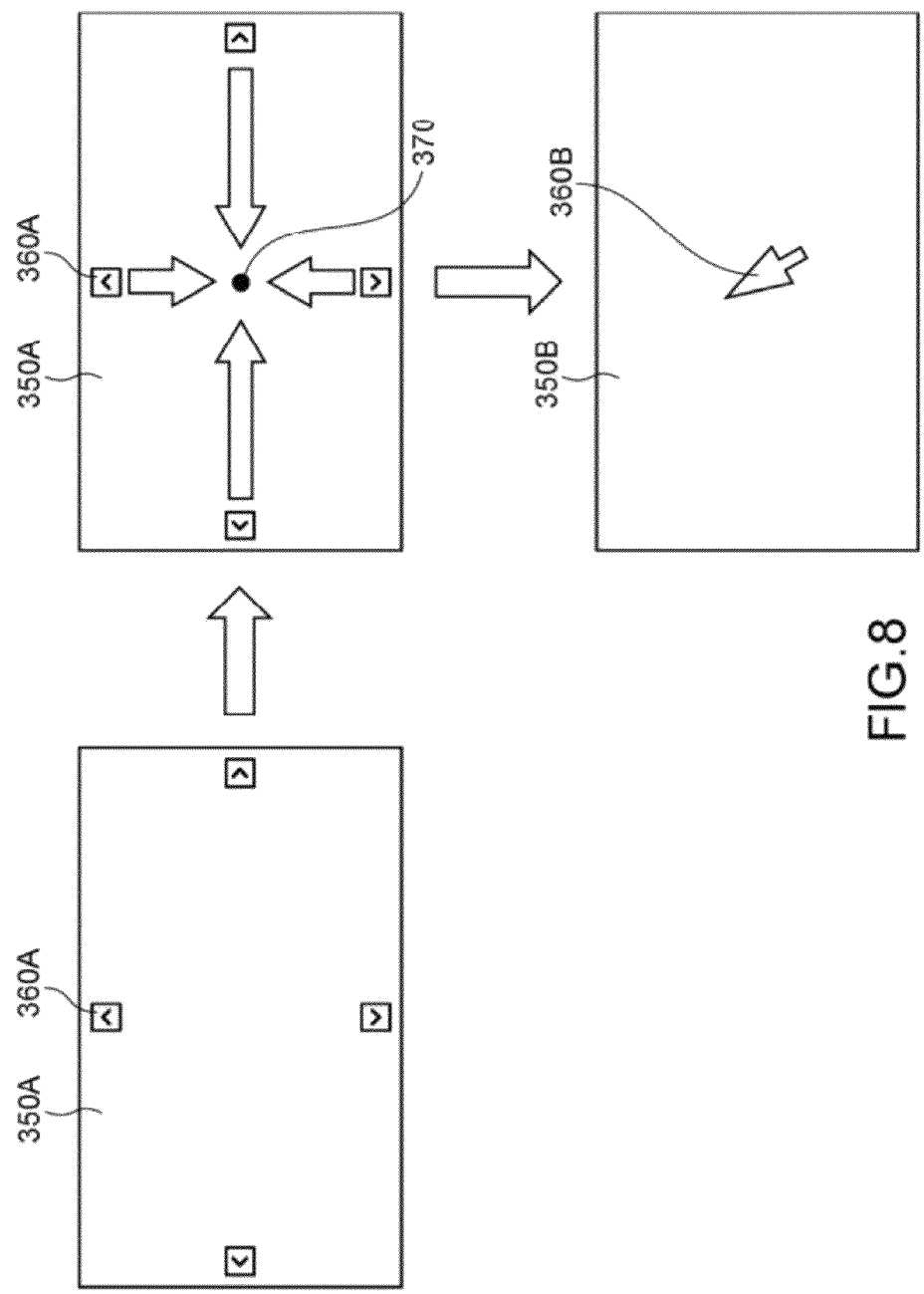
FIG. 8 is a schematic view showing a first and second graphical user interfaces (GUIs) displayed on a screen in a third embodiment of the present disclosure.

A third embodiment of the present disclosure will be described. FIG. 8 is a schematic view showing a first and second GUIs displayed on the screen in this embodiment.

In this embodiment, as a first GUI displayed in the scrolling state, a GUI having a plurality of parts is displayed. Specifically, as shown in FIG. 8, an icon 360A representing an arrow is displayed at the center of each of four sides of a screen 350A. By the icon 360A pointing in an outward direction of the screen 350A, the scrolling state in which the screen 350A can be scrolled is represented.

When the state is switched from the scrolling state to the pointing state, the plurality of icons 360A are moved to the center 370 of the screen 350A. The plurality of icons 360A are combined at the center 370 of the screen 350A. Then, a pointer (i.e., icon) 360B as a second GUI is displayed on a screen 350B. Accordingly, it is possible to visually recognize the fact that the state has been switched to the pointing state.

For example, the plurality of icons 360A may be moved in conjunction with the lapse of a predetermined time in Step 105 shown in FIG. 5. In other words, the movement of the plurality of icons 360A may function as an indicator of the lapse of time in Step 105. A predetermined time elapses at a timing at which the plurality of icons 360A are gathered at the center 370 of the screen 350A. Then, the pointer 360B is displayed and the state is switched to the pointing state at the same time.

In this manner, the GUIs are continuously changed so that a state change of the scrolling state and the pointing state can be visually recognized. As a result, operability of the touchpad is improved.

Further, the shape of the plurality of icons 360A and the shape of the pointer 360B may be associated with each other. For example, the plurality of icons 360A are combined, and an image representing a character or the like is thus generated. This image may function as the pointer 360B serving as the second GUI. Accordingly, the design can be improved.

The plurality of icons 360A and the pointer 360B according to this embodiment may be used in the second embodiment described above.

Fourth Embodiment

Figure 9A:
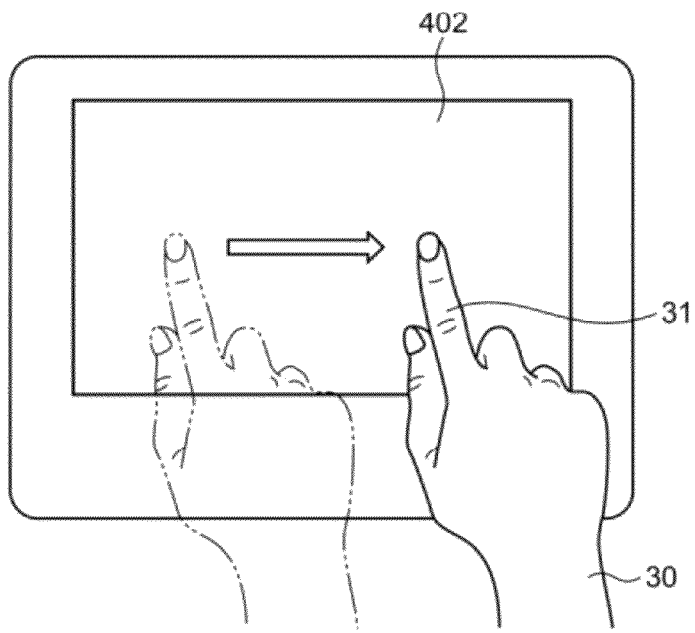
FIG. 9 are schematic views each showing a first GUI displayed on a screen in a fourth embodiment of the present disclosure.
Figure 9B:
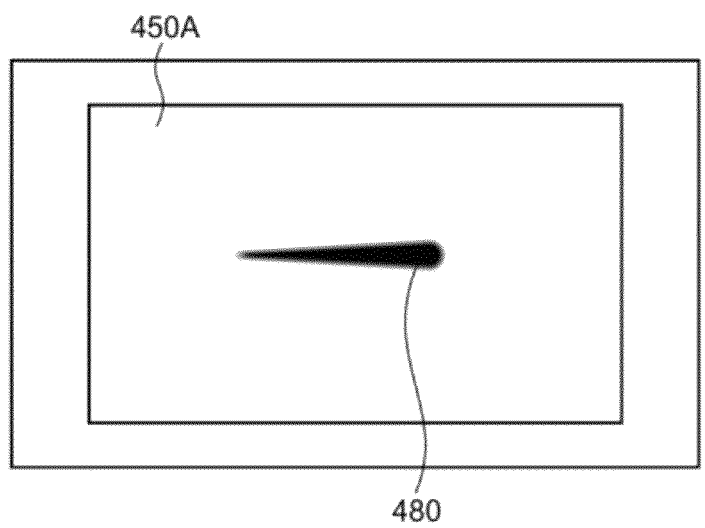

A fourth embodiment of the present disclosure will be described. FIG. 9 are schematic views each showing a first GUI on a screen in this embodiment. As shown in FIG. 9A, a drag operation is input to a touchpad 402 in the scrolling state. At this time, as shown in FIG. 9B, a trajectory image 480 representing a trajectory (i.e., direction) of the movement of the finger 31 is displayed on a screen 450A as a first GUI.

In other words, in this embodiment, in the case where a drag operation is not input, the first GUI is not displayed on the screen 450A. Accordingly, the entire screen 450A is easily grasped. When a drag operation is input, the trajectory image 480 is displayed. By the trajectory image 480, a correspondence relationship between the movement of the finger 31 and the scrolling operation of the screen 450A can be visually recognized.

It should be noted that in the first to third embodiments, the trajectory image 480 may be displayed.

Modified Example

Embodiments according to the present disclosure are variously modified without being limited to the embodiments described above.

For example, FIG. 10 are schematic views showing a modified example of the pointing start area 211 described in the second embodiment.

Figure 10A:
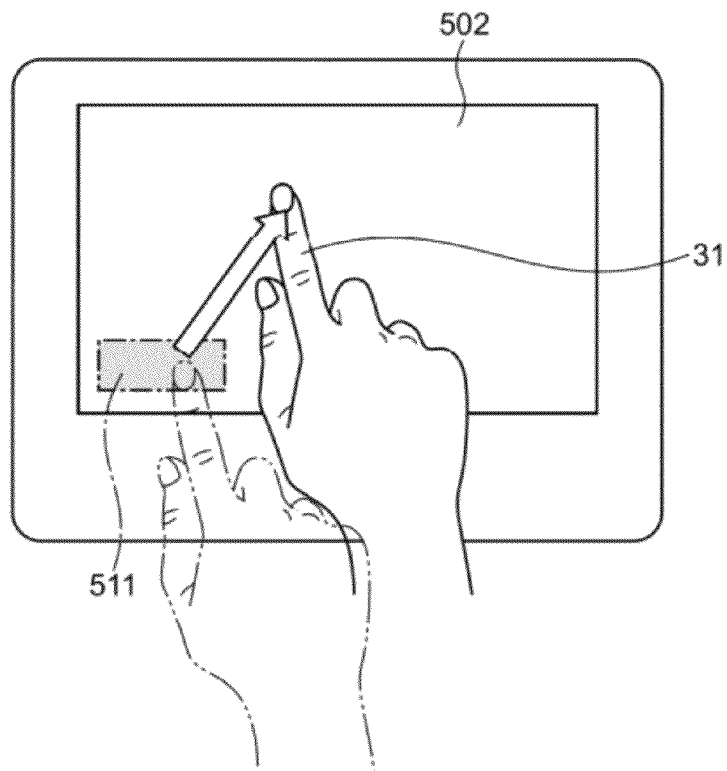
FIG. 10 are schematic views showing a modified example of a pointing start area described in the second embodiment.

As shown in FIG. 10A, an area other than a circumferential portion of a touchpad 502 may be set as a pointing start area 511. In other words, when the state is intended to be switched to the pointing state, a drag operation only has to be started by bringing the finger 31 into contact with the pointing start area 511. Accordingly, a pointer 560B is displayed on a screen 550B.

Figure 10B:
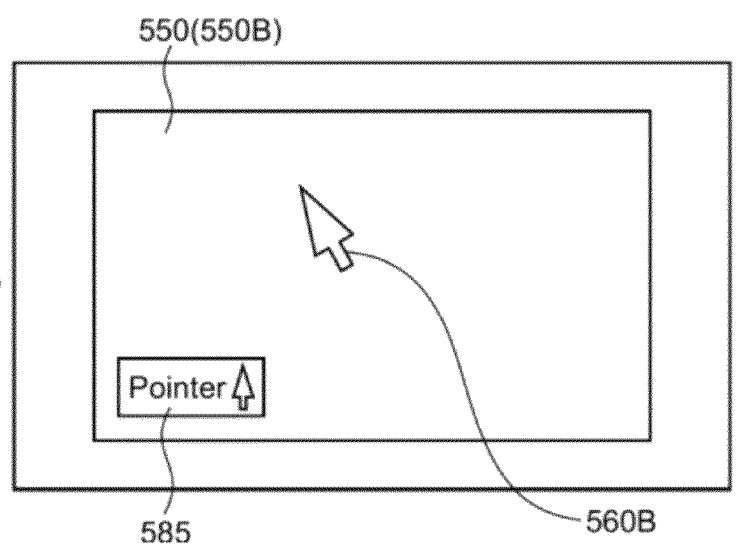

As shown in FIG. 10B, in an area of the screen 550, which corresponds to the pointing start area 511, an icon 585 representing the pointing start area may be displayed. For example, the shape of the icon 585 may be set to a pointer shape, or a text such as "Forest of pointer" may be added to the icon 585. Accordingly, design of the screen 550 can be improved.

In this manner, the position, size, shape, and the like of the pointing start area 511 can be set as appropriate. Further, when the finger comes into contact with the pointing start area 511, the state may be switched to the pointing state.

Figure 11:
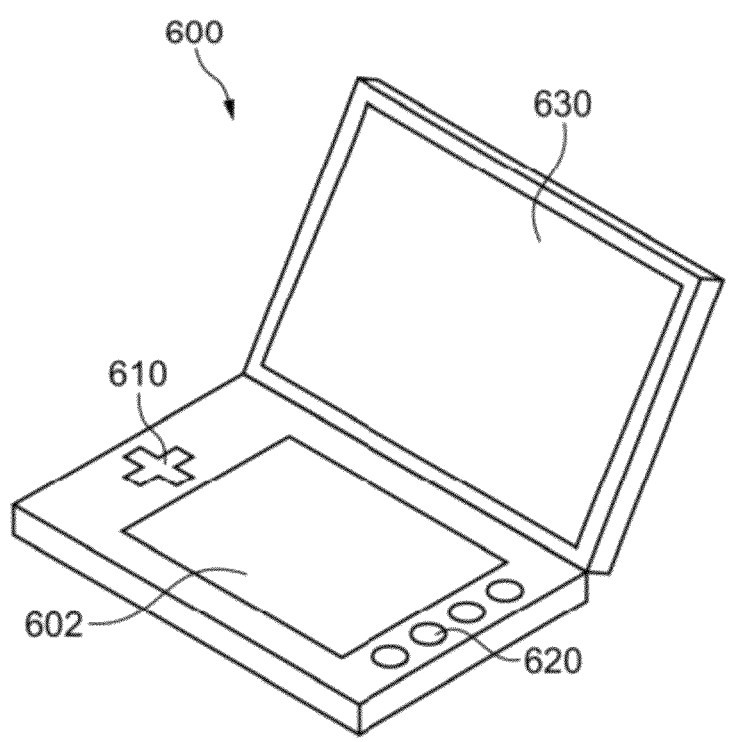
FIG. 11 is a schematic perspective view showing a modified example of the information processing apparatus shown in FIG. 1.

FIG. 11 is a schematic perspective view showing a modified example of the information processing apparatus 100 shown in FIG. 1. An information processing apparatus 600 includes a touchpad 602, arrow keys 610, operation buttons 620, and a display 630. For the operation on the touchpad 602 of such an information processing apparatus 600, the algorithms described in the embodiments described above may be applied. Accordingly, operability of the touchpad 602 is improved.

As the information processing apparatus according to the embodiments described above, a remote controller for controlling an operation of a display apparatus is used. However, as the information processing apparatus according to the embodiments of the present disclosure, an electronic apparatus such as a laptop personal computer (PC) including a touchpad or the like may be used. In addition, a computer including a touchpad or the like may be used.

In the description above, the proximity signal, the movement signal, and the like are output from the sensor of the touchpad to the CPU. Then, the movement direction and the movement amount of the operator are measured by the CPU. However, the sensor may include a control unit so that the sensor measures the movement direction and the movement amount of the operator. Further, that information may be output to the CPU. In this case, the touchpad and the CPU constitute the mode control unit.

In the description above, the contact of the finger to the touchpad has been described. However, a similar algorithm can be applied also to the approach of the finger to the touchpad.

In this embodiment, the touchpad is used as an input unit to receive an operation on a movement direction and movement amount in a two-dimensional space. However, the controller including the arrow keys 610 or the like shown in FIG. 11 may be used as an input unit. An operation on a movement direction and movement amount is input via the arrow keys. For example, based on a lapse time during which the operation on the movement direction and movement amount is not input, the pointing state and the scrolling state may be switched therebetween.

It should be understood by those skilled in the art that various modifications, combinations, sub-combinations and alterations may occur depending on design requirements and other factors insofar as they are within the scope of the appended claims or the equivalents thereof. Further, it should be understood that, as used herein, the indefinite articles "a" and "an" mean "one or more" in open-ended claims containing the transitional phrase "comprising," "including," and/or "having."

It should be noted that the present disclosure can be structured as follows.

(1) An information processing apparatus including an input unit configured to receive an operation on a movement direction and a movement amount in a two-dimensional space, and a mode control unit configured to switch, based on the operation, a mode between a first mode in which the movement direction and the movement amount are measured and a screen is scrolled and a second mode in which the movement direction and the movement amount are measured and a pointer on the screen is moved.

(2) The information processing apparatus according to Item (1), in which the input unit is a touchpad to receive the operation by an operator.

(3) The information processing apparatus according to Item (2), in which the mode control unit switches the mode between the first mode and the second mode based on a rest time of the operator on the touchpad.

(4) The information processing apparatus according to Item (3), in which the mode control unit switches the mode from the first mode to the second mode when the rest time exceeds a predetermined time in the first mode.

(5) The information processing apparatus according to Item (2), in which the mode control unit switches the mode between the first mode and the second mode based on a position of the operator on the touchpad.

(6) The information processing apparatus according to Item (5), in which the mode control unit switches the mode to the second mode when the operator is moved from a predetermined area of the touchpad.

(7) The information processing apparatus according to any one of Items (1) to (6), in which the mode control unit displays a first graphical user interface (GUI) displayed in the first mode and a second GUI displayed in the second mode.

(8) The information processing apparatus according to Item (7), in which the first GUI includes a plurality of parts, the second GUI is the pointer, and the mode control unit combines, when switching the mode from the first mode to the second mode, the plurality of parts to display the pointer.

(9) An information processing method, including receiving, by an input unit, an operation on a movement direction and a movement amount in a two-dimensional space, and switching, by a mode control unit, based on the operation, a mode between a first mode in which the movement direction and the movement amount are measured and a screen is scrolled and a second mode in which the movement direction and the movement amount are measured and a pointer on the screen is moved.

(10) A program causing a computer to function as an input unit configured to receive an operation on a movement direction and a movement amount in a two-dimensional space, and a mode control unit configured to switch, based on the operation, a mode between a first mode in which the movement direction and the movement amount are measured and a screen is scrolled and a second mode in which the movement direction and the movement amount are measured and a pointer on the screen is moved.

(11) The program according to Item (10), in which the input unit is a touchpad to receive the operation by an operator.

(12) The program according to Item (11), in which the mode control unit switches the mode between the first mode and the second mode based on a rest time of the operator on the touchpad.

(13) The program according to Item (12), in which the mode control unit switches the mode from the first mode to the second mode when the rest time exceeds a predetermined time in the first mode.

(14) The program according to Item (11), in which the mode control unit switches the mode between the first mode and the second mode based on a position of the operator on the touchpad.

(15) The program according to Item (14), in which the mode control unit switches the mode to the second mode when the operator is moved from a predetermined area of the touchpad.

(16) The program according to any one of Items (10) to (15), in which the mode control unit displays a first graphical user interface (GUI) displayed in the first mode and a second GUI displayed in the second mode.

(17) The program according to Item (16), in which the first GUI includes a plurality of parts, the second GUI is the pointer, and the mode control unit combines, when switching the mode from the first mode to the second mode, the plurality of parts to display the pointer.

The present disclosure contains subject matter related to that disclosed in Japanese Priority Patent Application JP 2011-065205 filed in the Japan Patent Office on Mar. 24, 2011, the entire content of which is hereby incorporated by reference.

What is claimed is:
1. An information processing apparatus, comprising:
a touchpad;
a hardware processor; and
a storage medium coupled to the processor and storing instructions that, when executed by the processor, cause the information processing apparatus to:
receive a proximity signal indicative of whether a user is providing input to the touchpad;
receive a movement signal indicative of whether the input includes movement of an object relative to the touchpad; and
select one of a pointing user input mode or a scrolling user input mode based on at least one of:
an amount of time for which the user continuously provides input not including movement of the object relative to the touchpad; or
an amount of time for which the user continuously fails to provide input,
wherein the scrolling user input mode is initially selected upon any initial occurrence of providing the input to the touchpad by the user, and then the pointing user input mode is subsequently selected upon an occurrence of a stoppage for a predetermined amount of time of the movement of the object relative to the touchpad.

2. The information processing apparatus of claim 1, wherein the storage medium stores instructions that, when executed by the processor, cause the information processing apparatus to select the pointing user input mode when the amount of time for which the user continuously provides input not including movement of the object relative to the touchpad exceeds a threshold amount of time.

3. The information processing apparatus of claim 1, wherein the storage medium stores instructions that, when executed by the processor, cause the information processing apparatus to select the scrolling user input mode when the user provides input to the touchpad after continuously failing to provide input for an amount of time exceeding a threshold amount of time.

4. The information processing apparatus of claim 1, comprising a display interface, wherein the storage medium stores instructions that, when executed by the processor, cause the display interface to generate a control signal to cause a screen to display an icon indicative of the selected user input mode.

5. The information processing apparatus of claim 4, wherein the storage medium stores instructions that, when executed by the processor, cause the display interface to generate a control signal to cause the screen to display one icon near the center of a side of the screen to indicate that the selected user input mode is the scrolling user input mode.

6. The information processing apparatus of claim 4, wherein the storage medium stores instructions that, when executed by the processor when the selected user input mode changes from the scrolling user input mode to the pointing user input mode, cause the display interface to generate a control signal to cause the screen to:
move a plurality of icons to a position near the center of screen; and
combine the plurality of icons into a single icon indicating that the selected user input mode is the pointing user input mode.

7. The information processing apparatus of claim 4, wherein the storage medium stores instructions that, when executed by the processor, cause the display interface to generate a control signal to cause the screen to display one icon near the center of the screen to indicate that the selected user input mode is the pointing user input mode.

8. The information processing apparatus of claim 1, comprising a display interface, wherein the storage medium stores instructions that, when executed by the processor when the selected user input mode is the scrolling user input mode, cause the display interface to generate a control signal to cause a screen to indicate a direction of movement of the object relative to the touchpad.

9. The information processing apparatus of claim 1, wherein the initial occurrence of providing the input to the touchpad by the user occurs immediately subsequent to a second predetermined amount of time during which no input is provided to the touchpad by the user.

10. A method of selecting a user input mode, comprising:
receiving a proximity signal indicative of whether a user is providing input to a touchpad;
receiving a movement signal indicative of whether the input includes movement of an object relative to the touchpad; and
selecting one of a pointing user input mode or a scrolling user input mode based on at least one of:
an amount of time for which the user continuously provides input not including movement of the object relative to the touchpad; or
an amount of time for which the user continuously fails to provide input,
wherein the scrolling user input mode is initially selected upon any initial occurrence of providing the input to the touchpad by the user, and then the pointing user input mode is subsequently selected upon an occurrence of a stoppage for a predetermined amount of time of the movement of the object relative to the touchpad.

11. A non-transitory, computer-readable storage medium storing instructions that, when executed by a processor, cause an information processing apparatus to:
receive a proximity signal indicative of whether a user is providing input to a touchpad;
receive a movement signal indicative of whether the input includes movement of an object relative to the touchpad; and
select one of a pointing user input mode or a scrolling user input mode based on at least one of:
an amount of time for which the user continuously provides input not including movement of the object relative to the touchpad; or
an amount of time for which the user continuously fails to provide input,
wherein the scrolling user input mode is initially selected upon any initial occurrence of providing the input to the touchpad by the user, and then the pointing user input mode is subsequently selected upon an occurrence of a stoppage for a predetermined amount of time of the movement of the object relative to the touchpad.

12. An information processing apparatus, comprising:
a touchpad;
a hardware processor; and
a storage medium coupled to the processor and storing instructions that, when executed by the processor, cause the information processing apparatus to:
receive a proximity signal indicative of whether a user is providing input to the touchpad;
receive a movement signal indicative of whether the input includes movement of an object from an outer area surrounding an inner area of the touchpad to the inner area of the touchpad; and
select a pointing user input mode when:
the proximity signal indicates the user is providing input to the touchpad; and
the movement signal indicates the input includes movement of the object from the outer area to the inner area.

13. The information processing apparatus of claim 12, wherein the storage medium stores instructions that, when executed by the processor, cause the information processing apparatus to select a scrolling user input mode when:
the proximity signal indicates the user is providing input to the touchpad; and
the movement signal does not indicate that the input includes movement of the object from the outer area to the inner area.

14. A method of selecting a user input mode, comprising:
receiving a proximity signal indicative of whether a user is providing input to a touchpad;
receiving a movement signal indicative of whether the input includes movement of an object from an outer area surrounding an inner area of the touchpad to the inner area of the touchpad; and
selecting a pointing user input mode when:
the proximity signal indicates the user is providing input to the touchpad; and
the movement signal indicates the input includes movement of the object from the outer area to the inner area.

15. A non-transitory, computer-readable storage medium storing instructions that, when executed by a processor, cause an information processing apparatus to:
receive a proximity signal indicative of whether a user is providing input to a touchpad;
receive a movement signal indicative of whether the input includes movement of an object from an outer area surrounding an inner area of the touchpad to the inner area of the touchpad; and
select a pointing user input mode when:
the proximity signal indicates the user is providing input to the touchpad; and
the movement signal indicates the input includes movement of the object from the outer area to the inner area.

\* \* \* \* \*